(12) United States Patent
Painter

(10) Patent No.: US 8,272,417 B2
(45) Date of Patent: Sep. 25, 2012

(54) EXPANDABLE MANDREL HAVING ADJUSTABLE WIDTH

(75) Inventor: Brian Painter, Dudley (GB)

(73) Assignee: Wyko Tire Technology Limited, Halesowen (GB)

( * ) Notice: Subject to any disclaimer, the term of this patent is extended or adjusted under 35 U.S.C. 154(b) by 756 days.

(21) Appl. No.: 12/280,331

(22) PCT Filed: Feb. 23, 2007

(86) PCT No.: PCT/GB2007/000625
§ 371 (c)(1),
(2), (4) Date: Mar. 5, 2009

(87) PCT Pub. No.: WO2007/096629
PCT Pub. Date: Aug. 30, 2007

(65) Prior Publication Data
US 2009/0242138 A1 Oct. 1, 2009

(30) Foreign Application Priority Data
Feb. 24, 2006 (GB) .................................. 0603700.6

(51) Int. Cl.
*B29D 30/24* (2006.01)
(52) U.S. Cl. ..................... 156/414; 156/394.1; 156/398; 156/415; 156/416; 156/417
(58) Field of Classification Search ............... 156/394.1, 156/398, 414, 415, 416, 417
See application file for complete search history.

(56) References Cited

U.S. PATENT DOCUMENTS

| 4,138,307 | A | 2/1979 | Rost |
| 4,155,796 | A | 5/1979 | Rambacher |
| 4,510,012 | A | 4/1985 | Kawaida |
| 5,354,405 | A | 10/1994 | Byerley |
| 6,673,183 | B2 * | 1/2004 | Byerley .................. 156/126 |
| 6,827,119 | B2 * | 12/2004 | Weaver et al. ................ 156/415 |
| 2005/0279444 | A1 | 12/2005 | Latieyre |

FOREIGN PATENT DOCUMENTS

| GB | 1322628 A | 7/1973 |
| JP | 60196330 A | 10/1985 |
| JP | 61297127 A | 12/1986 |

\* cited by examiner

*Primary Examiner* — Katarzyna Wyrozebski Lee
*Assistant Examiner* — Joshel Rivera
(74) *Attorney, Agent, or Firm* — Christensen O'Connor Johnson Kindness PLLC

(57) ABSTRACT

A rotary radial expand collapse tire building drum comprises segments defining an outer circumference of said drum, said segments being divided into two sets, one set being located to each opposite side of a transverse central plane of the drum, said central plane being disposed normal to a rotational axis of the drum, said two sets being adapted to be driven by a rotatable hub assembly between a collapsed position in which a formed tire carcass may be removed from the drum and an expanded position in which a tire carcass may be formed on said drum wherein each set of segments are mounted for selective relative axial using positioning means, and adjustment means is located outside of the rotational axis of the drum, which is arranged to adjust an overall working width of said drum. The invention allows for an axial positioning mechanism of a REC building drum.

10 Claims, 5 Drawing Sheets

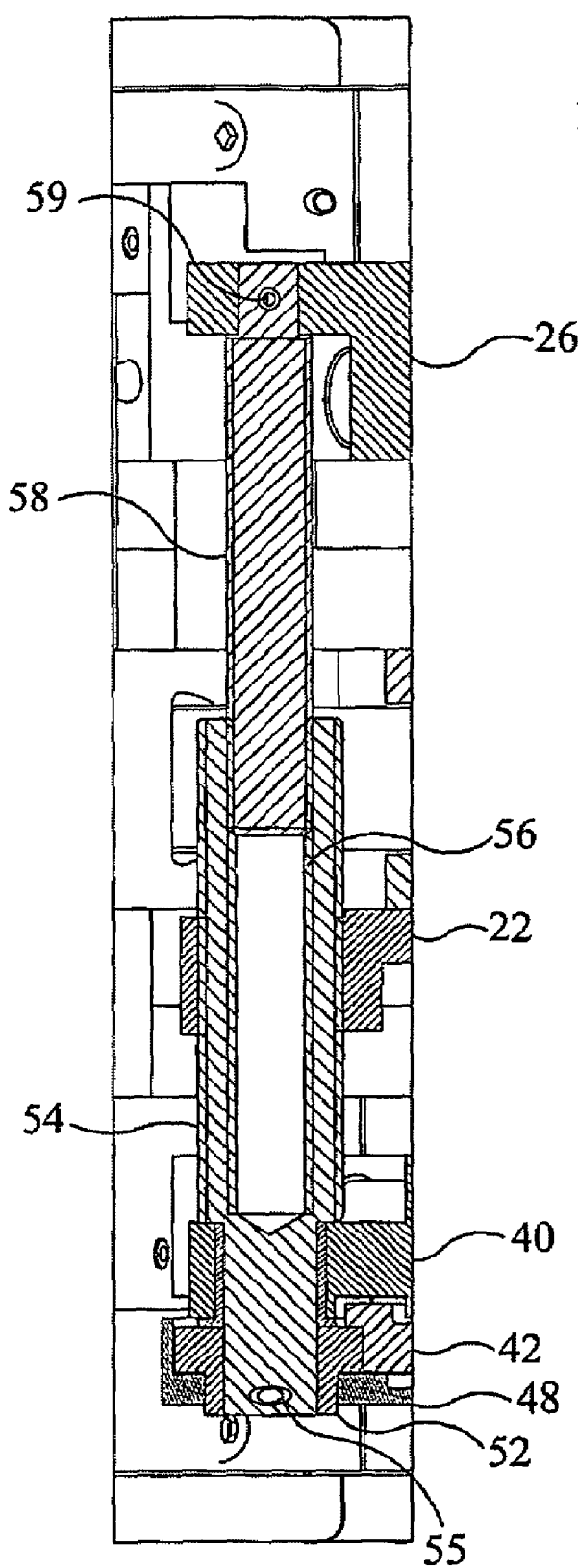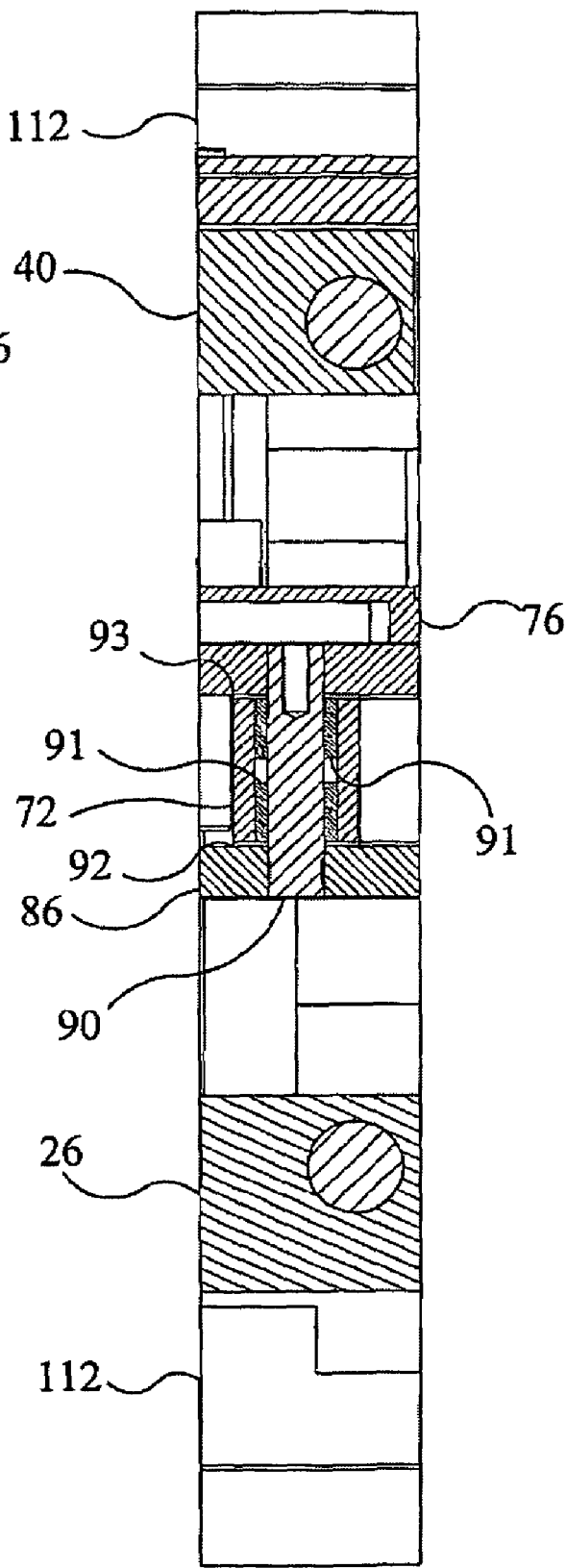
FIG 6
FIG 7

EXPANDABLE MANDREL HAVING ADJUSTABLE WIDTH

The present invention relates to tire building drums and in particular to a drum of adjustable width for use in the manufacture of tires of different widths employing the same tire building drum.

In the manufacture of vehicle tire, a tire carcass from individual components is overlaid onto an outer circumference of a rotatable drum. The diameter of the drum is collapsed to allow removal of the formed tire carcass.

Such tire building drums are known as Radial Expand Collapse or REC tire building drums. REC tire building drums are broadly of two distinct kinds: those in which rotary movement of a central shaft collapses the drum and those in which a push/pull movement of the central shaft collapses the drum. Due to the differences in construction of these two kinds of tire building drum, while there are superficial similarities, the teachings from one field are not considered transposable to the other.

In known tire building drums, the rotatable drum comprises a plurality of segments defining the outer circumference of the drum. The segments are divided into two sets, one set being located to each opposite side of a transverse central plane of the drum. The central plane is disposed normal to the rotational axis of the drum. The two sets of segments are adapted to be driven between a collapsed position in which a formed carcass may be removed from the tire building drum and an expanded position in which a tire carcass may be formed on the drum.

However, often in order to allow manufacture of tires of different widths, the width of the tire building drum may need to be changed several times in a manufacturing shift to allow for small or bespoke manufacturing runs. One example of a tire building drum in which such axial change is possible is shown in U.S. Pat. No. 4,636,277. Adjustment to the width of such a tire building drum requires the physical exchange of spacers between the sets of segments to define the outer circumference of a tire building drum for the manufacture of a desired width of tire. The time taken to alter the width can result in a significant downtime. Further, this arrangement requires the stocking of a large inventory of spacers.

One solution is to provide a plurality of gap shields mounted on and controlled by the expand collapse mechanism to cover the gap between the two sets of segments. Nevertheless the time taken to adjust the width of the tire building drum remains time consuming.

In WO 01/89819 A1 a push/pull REC tire building drum is shown. The two sets of segments are mounted for selective axial positioning thereof in order to adjust the overall working width of the tire building drum. The axial positioning mechanism allows for axial positioning of the sets of segments from a location external of the drum. This axial positioning mechanism operates through a main shaft, in which the push/pull mechanism is located. It is not possible to mount such an axial positioning mechanism in the main shaft of a rotary REC tire building drum.

It is an advantage of the present invention that it allows for an axial positioning mechanism for the two sets of segments of a rotary REC tire building drum.

According to the present invention, a rotary REC tire building drum comprises a plurality of segments defining an outer circumference of the tire building drum, the segments being divided into two sets, one set being located to each opposite side of a transverse central plane of the tire building drum, the central plane being disposed normal to the rotational axis of the drum, the two sets of segments being adapted to be driven by a rotatable hub assembly between a collapsed position in which a formed tire carcass may be removed from the tire building drum and an expanded position in which a tire carcass may be formed on the drum is characterised characterized in that the tire building drum further comprises mounting each set of segments for selective relative axial positioning to each opposite side of the transverse central plane and means located outside of the rotational axis of the drum to adjust the overall working width of the drum.

Preferably one set of segments is associated with an inboard hub located to one side of the transverse central plane and the other set of segments is associated with an outboard hub located to the opposite side of the transverse central plane, the means located outside of the rotational axis of the drum to adjust the overall working width of the drum comprising a first set of inboard leadscrews associated with the inboard hub and a second set of outboard leadscrews associated with the outboard hub, each of the inboard and outboard leadscrews being adapted for rotation with respect to one another such that rotation of the outboard leadscrews causes relative movement of the inboard leadscrews and the outboard leadscrews causing the axial separation of the inboard hub and the outboard hub to be adjusted.

More preferably a first end of each of the outboard leadscrews is permanently connected to a leadscrew gear located axially with respect to the outboard hub. Alternatively or additionally, a second end of each of the inboard leadscrews is fixedly connected to the inboard hub to prevent rotation between each of the inboard leadscrews and the inboard hub.

Preferably the inboard leadscrews and the outboard leadscrews are threadedly engaged with one another.

More preferably, the outboard leadscrews are provided with a thread of one hand and the inboard leadscrews are provided with a thread of common hand.

Conveniently the outboard leadscrews are provided with a thread of one pitch and the inboard leadscrews are provided with a thread of a different pitch. More preferably, the pitch ratio of the thread of each inboard leadscrew and each outboard leadscrew is 2:1.

Preferably the leadscrew gears of each of the outboard leadscrews are driven from a common spur gear. More preferably a drive mechanism is provided to drive selectively the spur gear.

Preferably the sets of segments are held in alignment on each side of the transverse central plane by mutually penetrating rods and tubes.

The invention will now be described, by way of example only, with reference to the accompanying drawings, in which:

FIG. 6 shows a sectional view along line VI-VI of FIG. 1; and

FIG. 7 shows a sectional view along line VII-VII of FIG. 1.

Figure 1:
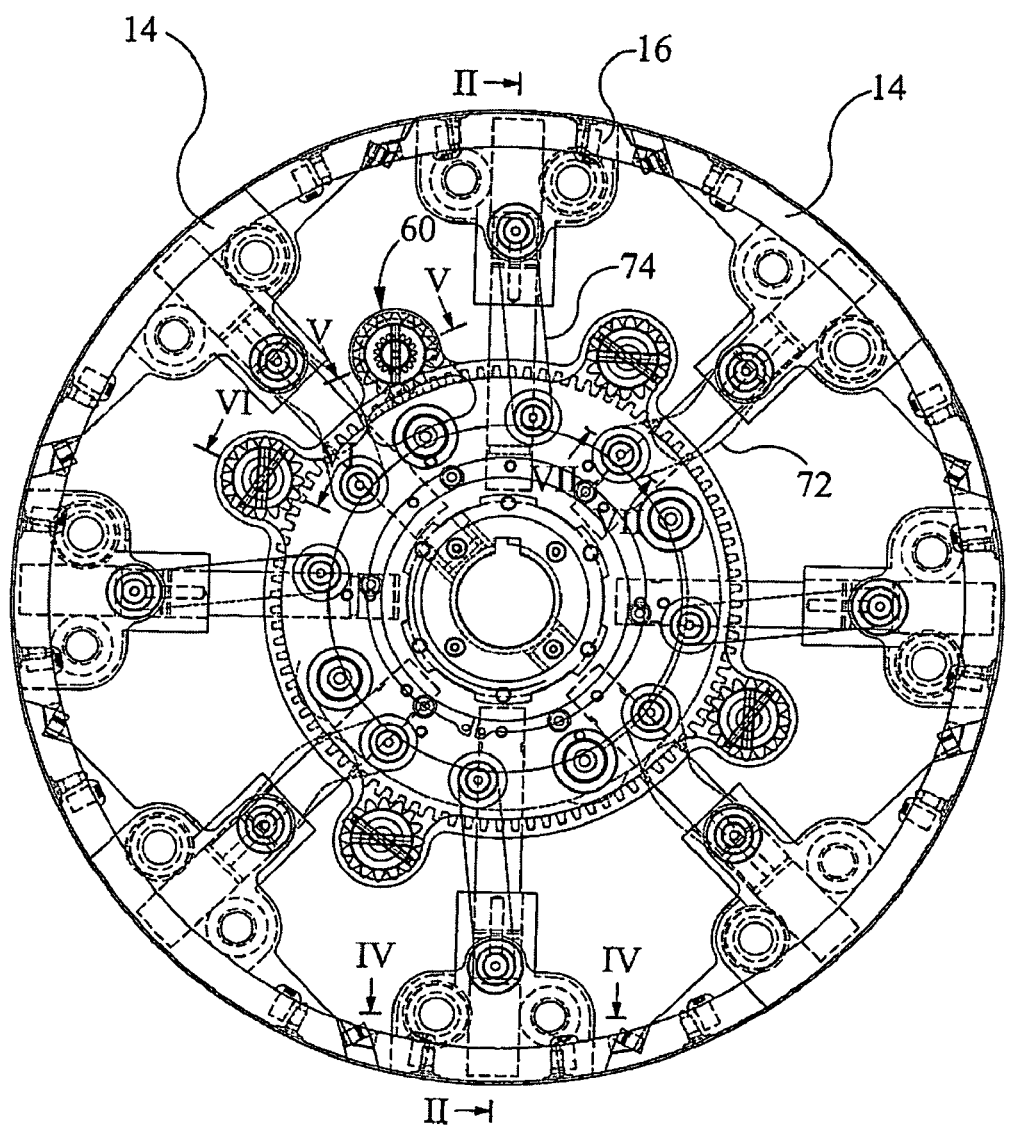
FIG. 1 shows a planar end view of a tire building drum according to the present invention.
Figure 2:
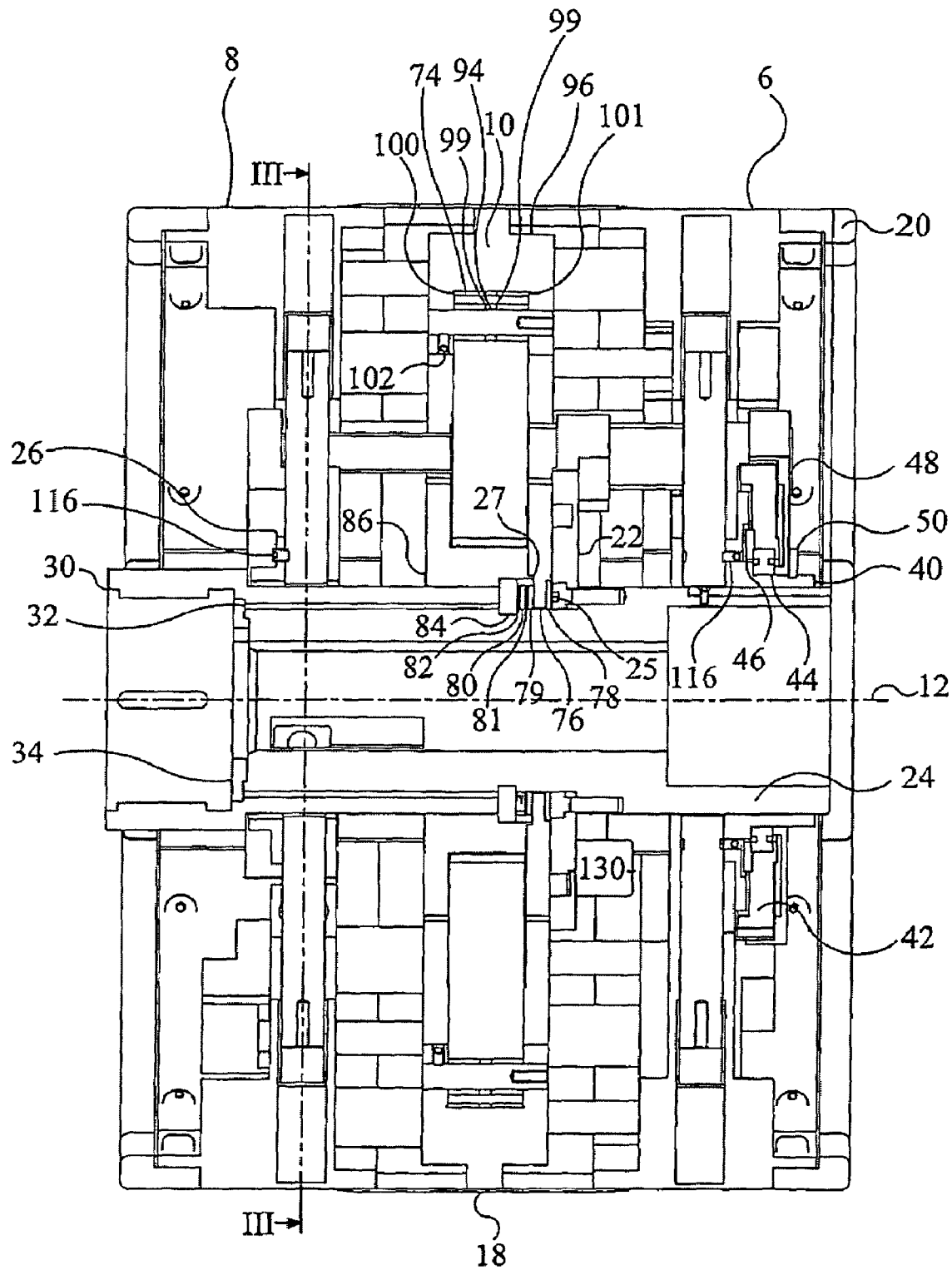
FIG. 2 shows a sectional view taken along the line II-II in FIG. 1.
Figure 3:
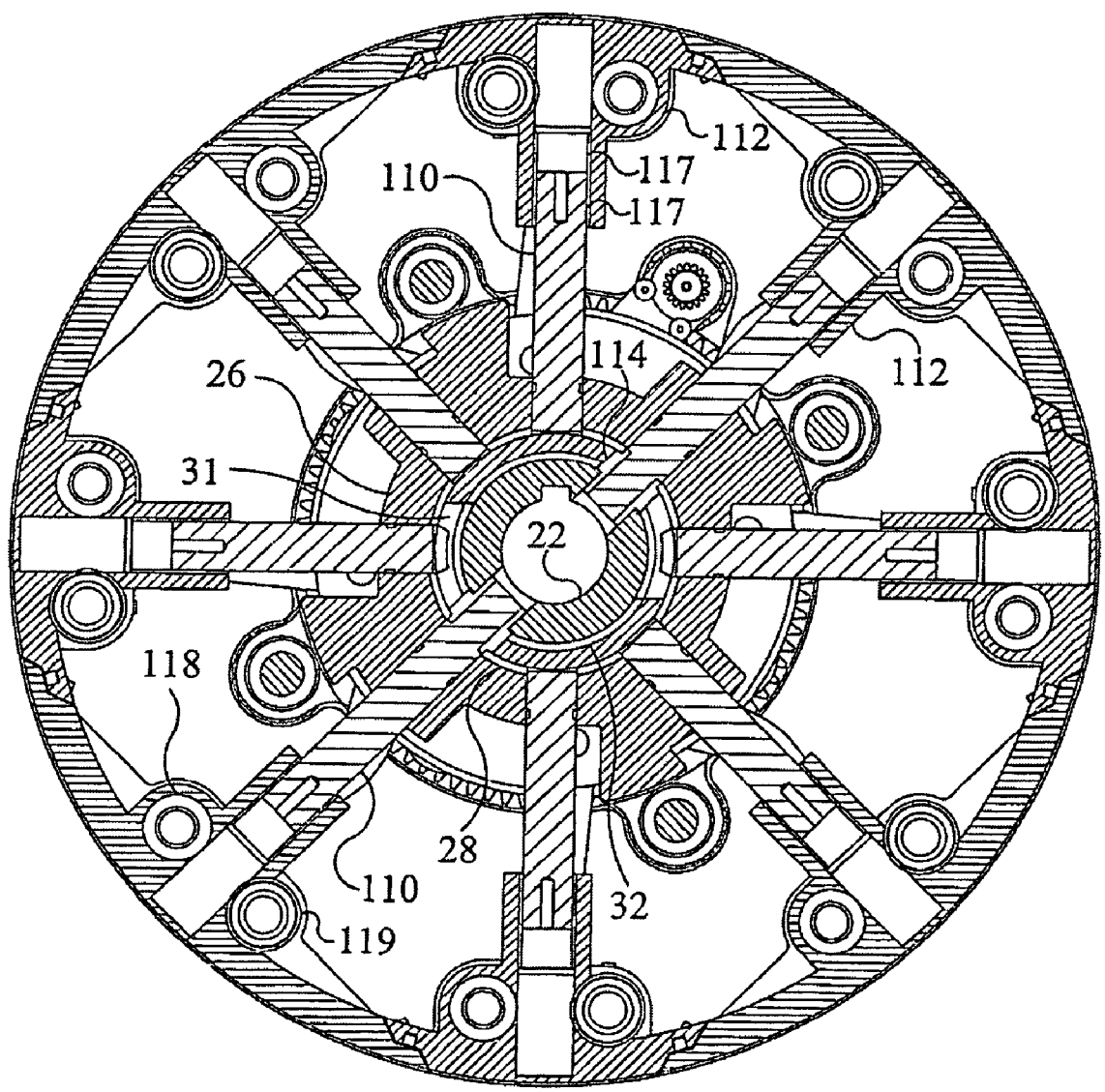
FIG. 3 shows a sectional view along the line III-III in FIG. 2.

Referring first to FIGS. 1 and 2, there is shown a tire building drum assembly in accordance with the present invention. The tire building drum assembly comprises a rotatable hub assembly, a plurality of segments supported from the hub assembly for expanding and contracting movement between a collapsed position in which the tire building drum has a relatively small overall diameter and an expanded position in which the segments define a cylindrical tire building deck for the tire building drum of larger overall diameter. As best seen in FIG. 2 the segments comprise first and second sets of segments, the first set 6 being disposed on a first outboard side of a transverse centre plane 10 of the tire building drum and the second set 8 being disposed on a second inboard side of the transverse centre plane. The transverse centre plane is oriented normal to the rotational axis 12 of the drum.

Each set of segments comprises alternating larger and smaller segments 14,16. The larger and smaller segments are mounted for simultaneous radial movement between the collapsed and expanded positions. Associated larger and smaller gap shields 18 are provided to close the axial gap between the first and second sets of segments. The side edges of the segments may be provided with a suitable chamfered or rounded edge piece 20 forming a segmented ring to define the outermost edges of the outermost circumference or deck of the tire building drum.

The first and second sets of segments are mounted for relative axial displacement to control the width of the tire building drum.

A hub plate 22 is fixedly mounted to a hub shaft 24 for movement therewith. The hub plate may be fixed by any suitable means, such as in the illustrated embodiment by a hexagon socket countersunk head screw 25. At the inboard end of the assembly an inboard hub 26 is mounted. The inboard hub 26 is mounted on an adaptor 30. The adaptor 30 is mounted about the inboard end of the hub shaft 24 by way of an adaptor bush 32 and held in position by an end cap 34. The inboard hub 26 is mounted to the adaptor 30 by way of inboard hub bush 28 allowing axial movement of the inboard hub 26 with respect to the adaptor 30. The hub shaft is splined. The adaptor is also splined. The adaptor 30 is provided with a window 36.

At the outboard end of the hub shaft 24 an outboard hub 40 is mounted. A spur gear 42 is mounted to the outboard hub for rotational movement with respect to the outboard hub 40 by a ball bearing race 44. The ball bearing race 44 is located between a bearing retainer 46 located inboard of the bearing race and a cover plate 48 located outboard of the bearing race. A spring retaining ring 50 adapted to be seated in a circumferential groove in the outboard hub 40 retains the cover plate 48 in position.

The larger and smaller segments of the inboard and outboard segment sets are carried from the respective inboard and outboard hubs 26,40.

A plurality, in the illustrated embodiment, four leadscrew gears 52 are located about the spur gear 42 in engagement therewith. Each leadscrew gear 52 is located within an opening in the cover plate 48 and is held axially but is free to rotate therein. Each leadscrew gear 52 is permanently connected to an outboard leadscrew 54 by any convenient means such as a spring type straight pin 55. Each outboard leadscrew 54 is mounted for rotation in both the outboard hub 40 and the hub plate 22. Each outboard leadscrew 54 is provided with an internal thread 56. Within each internal thread 56, a threaded inboard leadscrew 58 is located. Conveniently the threads are of common hand. Each inboard leadscrew is fixedly connected to the inboard hub by any suitable means such as a spring type straight pin 59 so as to prevent relative movement therebetween.

Figures 4, 5:
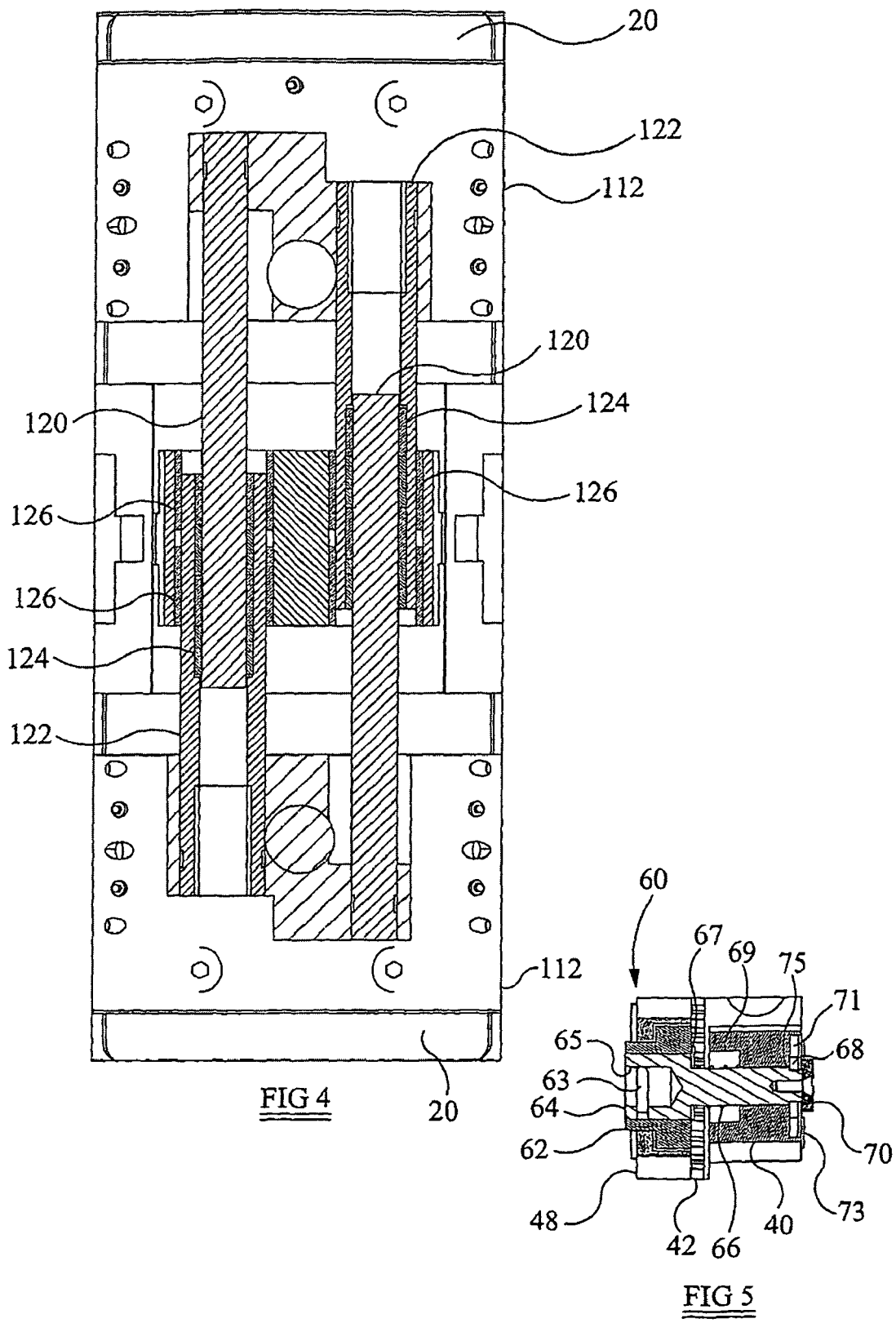
FIG. 4 shows a sectional view along line IV-IV of FIG. 1.
FIG. 5 shows a sectional view along line V-V of FIG. 1.

A drive mechanism (described below with reference to FIG. 5) may be engaged enabling a drive gear 62 to drive the spur gear 42. Rotation of the spur gear 42 in turn causes rotation each of the leadscrew gears 52 and the associated outboard leadscrews 54. Rotation of the outboard leadscrews 52 will cause the associated inboard leadscrews 58 to jack out (or in depending upon the direction of rotation) pushing the inboard hub 26 away (or toward) the outboard hub 40.

Preferably, the pitch ratio of the thread of each inboard leadscrew 58 and outboard leadscrew 54 is 2:1.

The drive mechanism 60 further comprises a drive means mounted for rotation in an opening in the outboard hub 40. The drive means comprises a drive shaft 64 permanently connected to a drive gear 62. The drive shaft 64 comprises a main shank portion and a head portion located at a first end thereof. Conveniently, the head portion of the drive shaft 64 is permanently connected to the drive gear 62 by a straight pin 63 extending through both the head portion of the drive shaft 64 and the drive gear 62. The head portion of the drive shaft 64 is provided with a recess 65 across which the pin 63 extends. A washer 67 is mounted on the drive shaft at the shoulder between the head portion and shank portion of the drive shaft 64. The hub 40 is provided with a recess 69. A spring means such as a helical spring 66 is located about the shank of the drive shaft 64 between the washer 76 and an end face of the recess 69. The shank of the drive shaft 64 is provided at an end remote from the head with an outer lock gear 68 secured thereto, for example by a riveted lock ring end cap 70. The outer lock gear 68 is secured to the shank of the drive shaft 64 against relative rotation with respect to the shank of the drive shaft 64. The outboard hub 40 is provided with a shaped recess within which the outer lock gear 68 may be received. Conveniently, the shaped recess is provided by an outer lock ring 71 provided in a shallow circular recess provided in the outboard hub. The outer lock ring 71 may conveniently be secured to the outboard hub 40 by a headed fastener such as a counter sunk screw 73. The spring means normally biases the drive shaft 64 such that the lock gear 68 is seated within the outer lock ring 71 thereby preventing rotation of the drive means. A bush or bearing 75 is conveniently provided within the outboard hub 40 about the shank of the drive shaft 64.

By engaging the drive shaft 64 with a suitable, for preference dedicated, tool, the lock gear 68 may be moved axially and out of engagement with the outer lock ring 71. The tool may then be used to rotate the drive shaft, which due to engagement with the spur gear causes rotation of the spur gear 42 and the associated leadscrew gears 52. It will be noted that in the absence of the tool, the lock gear 68 acts to be seated within the outer lock ring 71 to prevent rotation of the drive means and so alteration of the axial position of the inboard and outboard hubs 26,40 (and their associated segment sets).

The gap shields 18 are adapted to be mounted to the tire building drum assembly by a series of alternating primary and secondary links 72,74. An outboard swing arm plate 76 is secured to the hub shaft 24 for rotation therewith between first and second thrust washers 78,79. Inboard and adjacent to the second thrust washer 79 a thrust needle roller and cage assembly 80 is located between third and fourth thrust washers 81,82. Adjacent and slightly further inboard a split housing washer 84 is seated in a groove in the hub shaft 24. The outboard swing arm plate 76 is located axially adjacent to the hub plate 22. A swing arm plate 86 is located over the adaptor 30. The swing arm plate 86 is splined to rotate with the adaptor 30. A lower shoulder of the swing arm plate 86 seats over the split housing washer. A radially extending flange 87 of the swing arm plate 86 extends over the thrust needle roller and cage assembly 80 and seats within a depression formed in the outboard swing arm plate 76. By splitting the swing arm into two components, it is possible to position the thrust washers and split housing washer 84 to fix the position of the hub plate 22 relative to the hub shaft 24.

The primary and secondary links 72,74 are each pivotally connected at a first end about link pins 90 extending between the outboard swing arm plate 76 and the swing arm plate 86. Conveniently a bush 91 is provided between the link 72,74 and the link pin 90 and thrust washers 92,93 between the link pin 91 and each of the outboard swing arm plate 76 and the swing arm plate 86. The primary and secondary links 72,74 are each pivotally connected at a second end by link pins 94 respectively to primary and secondary gap shield supports 96,98. Conveniently one or more bushes 99 is provided between the link 72,74 and the gap shield support 96,98 and thrust washers 100,101 provided between the ends of the link pin and the respective gap shield support. As may be seen from the Figures the primary links 72 are provided with a curvature while the secondary links 74 are straight. Each of the gap shield supports is fixedly connected to its respective link pin by a suitable means such as hexagon socket set screw 102.

The segment sets are also adapted to move in sympathy with the inboard and outboard hub plates 26,40. Each segment comprises a pillar 110 and a body segment 112. Each pillar 100 is secured at a first end to a hub plate 22, 40. At the inboard end, two of the door pillars 100 are secured through the inboard hub plate 26 and through a window 31 in the adaptor 30 to the hub shaft 24. The first ends of these two door pillars 110 are received in inboard drive keys 114 themselves secured to the hub shaft 24 for rotation therewith. The remaining pillars, including those at the outboard end, are retained in a respective hub plate 26,40 by suitable fasteners, such as hexagon socket set screws 116.

Each body segment 112 is provided with an opening in the form of a blind bore lined with at least one bush 117 allowing the body segment 112 to be slidably mounted on a second end of the pillar 110. Each body segment 112 is provided with first and second bores 118,119 passing laterally of the blind bore. The first bore of an inboard body segment 112 is provided with a door rod 120. A first end of the door rod 120 is secured in the first bore. The second bore of the inboard body segment 112 is provided with a door tube 122. A first end of the door tube 122 is secured in the second bore. A second end of the door tube 122 is provided with one or more bushings or bearings 124. A complementary arrangement of door rod and door tube is provided in the outboard body segment 112, such that the door rod 120 of the inboard body segment penetrates the door tube 122 of the outboard body segment and that the door rod 112 of the outboard body segment penetrates the door tube 120 of the inboard body segment. The second end of each door tube is supported in bushes 126 provided in first and second through bores provided in the gap shield support 96,98.

Four radially spaced poppet caps 130 are provided to the outboard side of the hub plate 22. The poppets are adapted to be urged into corresponding recesses provided in the adjacent outboard swing arm plate 76 to retain the tire building drum in the expanded position.

The invention claimed is:

1. A rotary radial expand collapse tire building drum comprising a plurality of segments defining an outer circumference of said tire building drum, said segments being divided into two sets, one set being located to each opposite side of a transverse central plane of said tire building drum, said central plane being disposed normal to a rotational axis of said drum, said two sets of segments being adapted to be driven by a rotatable hub assembly between a collapsed position in which a formed tire carcass may be removed from said tire building drum and an expanded position in which a tire carcass may be formed on said drum wherein each set of segments are mounted for selective relative axial positioning, and an adjustment means located outside of the rotational axis of said drum, which is arranged to adjust an overall working width of said drum, said adjustment means including an inboard hub and an outboard hub, wherein a first one of said two sets of segments is associated with said inboard hub located to one side of said transverse central plane and a second one of said two sets of segments is associated with said outboard hub located to the opposite side of said transverse central plane, and in which said adjustment means further comprises a first set of inboard leadscrews associated with said inboard hub and a second set of outboard leadscrews associated with said outboard hub, each of said inboard leadscrews and said outboard leadscrews being adapted for rotation with respect to one another such that rotation of said outboard leadscrews causes relative movement of said inboard leadscrews and said outboard leadscrews causing the axial separation of said inboard hub and said outboard hub to be adjusted.

2. A tire building drum according to claim 1, wherein a first end of each of said outboard leadscrews is permanently connected to a leadscrew gear located axially with respect to said outboard hub.

3. A tire building drum according to claim 1, wherein a second end of each of said inboard leadscrews is fixedly connected to said inboard hub to prevent rotation between each of said inboard leadscrews and said inboard hub.

4. A tire building drum according to claim 2, wherein said inboard leadscrews and said outboard leadscrews are threadedly engaged with one another.

5. A tire building drum according to claim 4, wherein said outboard leadscrews are provided with a thread of one hand and said inboard leadscrews are provided with a thread of the same hand as said outboard leadscrews.

6. A tire building drum according to claim 4, wherein said outboard leadscrews are provided with a thread of one pitch and said inboard leadscrews are provided with a thread of a different pitch.

7. A tire building drum according to claim 6, wherein a pitch ratio of said thread of each inboard leadscrew and each outboard leadscrew is 2:1.

8. A tire building drum according to claim 2, wherein said leadscrew gears of each of said outboard leadscrews are driven from a common spur gear.

9. A tire building drum according to claim 8, wherein a drive mechanism is provided to drive selectively said spur gear.

10. A tire building drum according to claim 1, wherein solid sets of segments are held in alignment on each side of said transverse central plane by mutually penetrating rods and tubes.

\* \* \* \* \*